M. J. Hill,
Tooth Extractor.
Nº 2,119.    Patented June 7, 1841.
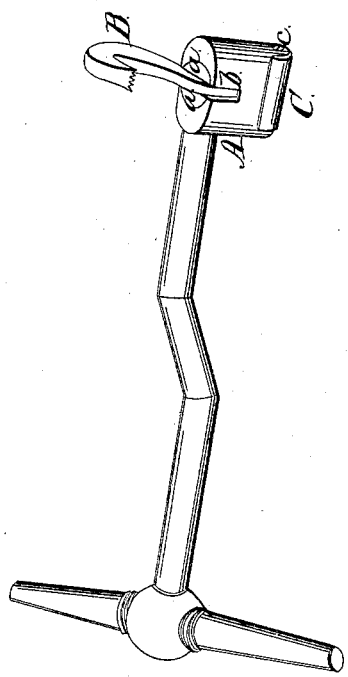

UNITED STATES PATENT OFFICE.

MOSES J. HILL, OF BLOOMFIELD, INDIANA.

MANNER OF CONSTRUCTING TOOTH-EXTRACTORS.

Specification of Letters Patent No. 2,119, dated June 7, 1841.

*To all whom it may concern:*

Be it known that I, MOSES J. HILL, of Bloomfield, in the county of Lagrange and State of Indiana, have invented a new and useful Improvement in the Ordinary Key or Instrument for Extracting Teeth; and I do hereby declare that the following is a full and exact description thereof.

In the key, as ordinarily constructed, for the purpose of extracting teeth, the lower end of the bolster, which bears against the tooth in the operation of extracting, is made solid, the whole of the bolster being in one piece.

My improvement consists in combining a friction roller with the bolster in such a manner as that said roller shall constitute the bearing part of said bolster, by means of which the bolster more readily adapts itself to the tooth, and is less apt to slip than when made solid. The effect of this construction is also, in many cases, to cause the tooth to rise in a direction more nearly vertical than with the ordinary bolster, for, as the claw presses into the root of the tooth, the roller will readily turn, following the tooth as it rises, and thus producing the desired effect.

In the accompanying drawing I have given a perspective view of my improved tooth extractor.

A, is the bolster, and B, a hook or claw, which I usually connect therewith in a simple and improved manner, as follows: $a, a,$ is a cylindrical piece of steel, which if fitted into a corresponding recess made in the head of the bolster to receive it, and when in place it is retained by a check pin entering a groove at its lower end, or by any analogous contrivance. This cylindrical piece is notched so as to receive the joint end of the claw, and there is a corresponding notch $b$, in the head of the bolster, which holds the claw in place when the instrument is in use. By means of this device the claw can be readily changed from side to side without removing the joint pin, or the employment of a catch to hold it in place. When the claw is to be removed this is readily done by turning the cylindrical piece $a, a$, around, so that the joint pin shall coincide with the notch $b$.

E, is the steel friction roller which constitutes the bearing part of the bolster, a suitable recess being formed therein to receive it. $c$, is the head of a screw which passes through said roller, and upon which it revolves. This roller may have its surface toothed, or otherwise rendered rough, if desired; but I have not found this necessary in practice, its revolution on its axis causing it always to adapt itself to, and firmly embrace the tooth.

Having thus fully described the nature of my invention, and shown the manner in which the same is carried into operation, what I claim therein, and desire to secure by Letters Patent, is—

The combining of a friction roller with the bolster of the ordinary key for extracting teeth, in such a manner as that said friction roller shall constitute the bearing part of the bolster in the operation of extracting a tooth, as herein set forth.

MOSES J. HILL.

Witnesses:
JOHN MOORE,
O. C. WARD.